Feb. 12, 1952   G. H. WHITNEY ET AL   2,585,711
HYDRAULIC BRAKE CONTROL
Filed Sept. 7, 1948                            2 SHEETS—SHEET 1

Guy H. Whitney
Alonzo J. Rosso
   INVENTORS

Feb. 12, 1952    G. H. WHITNEY ET AL    2,585,711
HYDRAULIC BRAKE CONTROL
Filed Sept. 7, 1948    2 SHEETS—SHEET 2
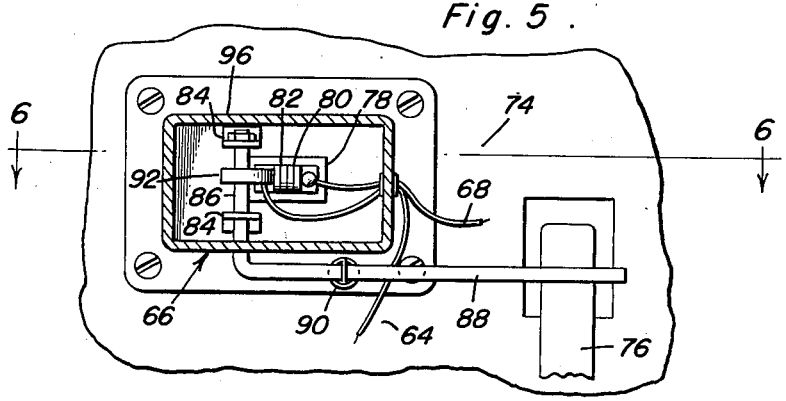
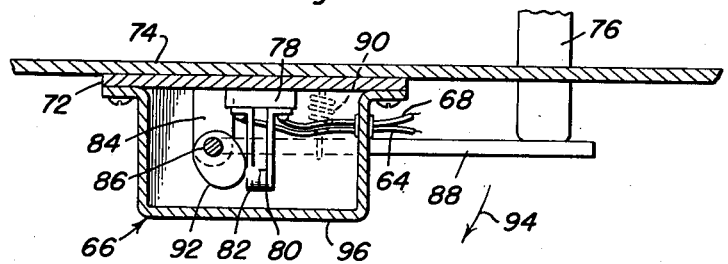
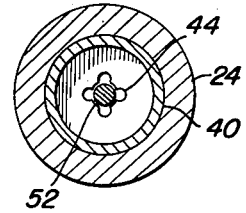
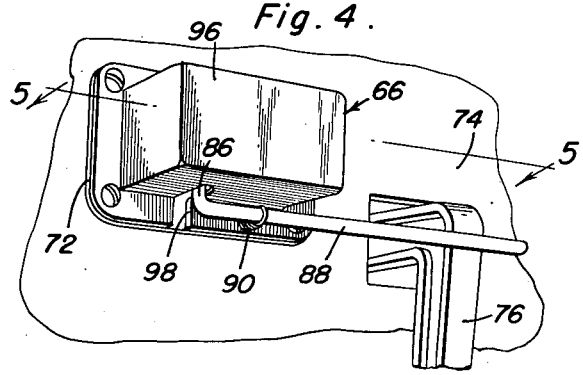
Guy H. Whitney
Alonzo J. Rosso
INVENTORS Patented Feb. 12, 1952

2,585,711

UNITED STATES PATENT OFFICE 2,585,711

HYDRAULIC BRAKE CONTROL

Guy H. Whitney, Morrisville, Pa., and Alonzo J. Rosso, Washington Crossing, N. J.

Application September 7, 1948, Serial No. 48,054

1 Claim. (Cl. 137—139)

This invention relates to new and useful improvements and structural refinements in controls for hydraulic brakes, and the principal object of the invention is to facilitate locking of the brake system in an applied position, without the necessity of manually retaining the brake system so applied.

Particularly, the invention contemplates the provision of a locking control for hydraulic brakes on automobiles and similar vehicles, permitting the brakes to remain "applied" or "on" if desired, after the operator removes his foot from the brake pedal.

The advantages resulting from the use of the invention may be readily appreciated, inasmuch as a vehicle equipped with the invention and with its brakes locked, will be quite convenient to manipulate while starting on hills, and also, will not be so easily stolen or misappropriated by being towed away by unauthorized persons.

An important feature of the invention resides, therefore, in the provision of remotely actuated means for preventing the return of brake fluid to the master cylinder after the brakes have been applied, whereby the brakes will not be released, unless the operator wishes to do so.

Another feature of the invention lies in the association of the brake locking control with the ignition system of the vehicle, matters being so arranged that the locking control is inoperative while the engine of the vehicle is running, but becomes energizable when the ignition system is inactive.

A further feature of the invention resides in the association of the locking control with the clutch pedal of the vehicle, this being so arranged that the locking control, normally inactive, becomes energizable upon depression of the clutch pedal.

Additional advantages of the invention lie in its simplicity of construction, ease and convenience of manipulation, and in its adaptability to automotive vehicles of various types.

With the above more important objects and features in view, and such other objects and features as may become apparent as this specification proceeds, the invention consists essentially of the arrangement and construction of parts as illustrated in the accompanying drawings, in which:

Figure 3 is a cross-sectional view, taken substantially in the plane of the line 3—3 of Figure 2;

Figure 4 is a fragmentary perspective view of a floor board and clutch pedal of the vehicle, showing a switch used in the invention as being associated with the clutch pedal;

Figure 5 is a cross-sectional view, taken substantially in the plane of the line 5—5 of Figure 4; and Figure 6 is a cross-sectional view, taken substantially in the plane of the line 6—6 of Figure 5.

Like characters of reference are employed to designate like parts in the specification and throughout the several views.

Figure 1:
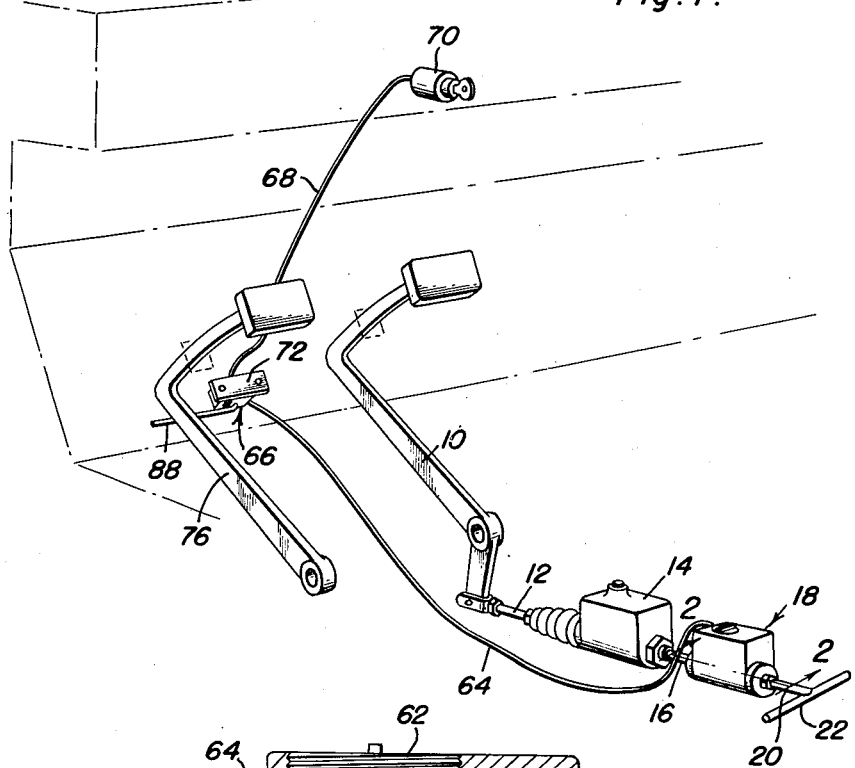
Figure 1 is a perspective view showing portions of the vehicle brake, clutch and ignition systems, with the invention associated therewith.

Referring now to the accompanying drawings in detail, the reference character 10 designates a brake pedal of a vehicle connected by means of a link 12 to a conventional master cylinder assembly 14, the latter, in turn, communicating through the medium of a pressure transmitting conduit 16 with what may be generally referred to as an electro-magnetic valve 18.

This valve, in turn, is connected by further pressure transmitting conduits 20, 22 to the wheel cylinders (not shown) in the conventional, well known manner.

The valve 18 as disclosed in the accompanying drawings, embodies in its construction a substantially cylindrical body portion 24 provided with an axial bore or chamber 26, in the end portions of which are pressed suitable end caps 28, 30. The latter, in turn, are formed with suitable passages 32, 34, respectively, communicating with the bore 26, and suitable gaskets 36 are interposed between the flanges of the caps 28, 30 and the ends of the body 24, for obvious reasons.

Figure 2:
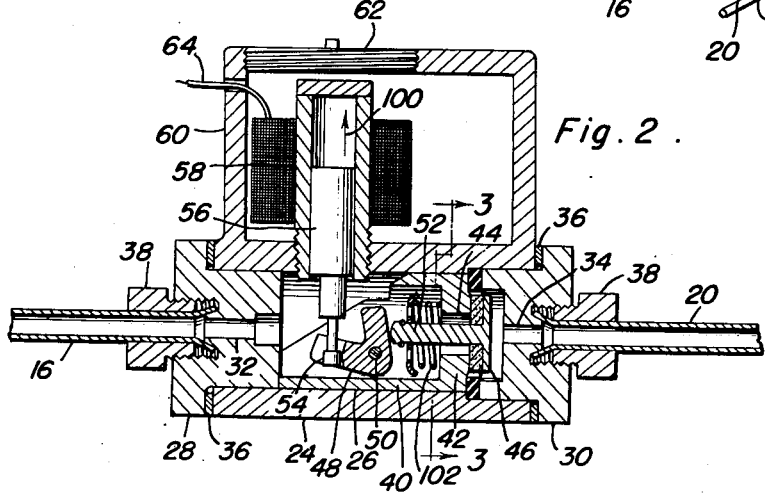
Figure 2 is a cross-sectional view, taken substantially in the plane of the line 2—2 of Figure 1.

The aforementioned conduits 16, 20 are connected to the respective caps 28, 30, by suitable coupling nuts 38, the conduits 16, 20, communicating with the bore 26 through the medium of the passages 32, 34, respectively, as is best shown in Figure 2.

A substantially tubular insert 40 is positioned in the bore 26 between the caps 28, 30 and is provided adjacent the cap 30 with an end wall 42, the latter, in turn, being formed with a fluid passage 44 and being equipped with a normally closed, spring pressed valve unit 46 of the conventional type commonly used in hydraulic brake master cylinders.

It will be apparent from the foregoing that the valve unit 46, when closed, facilitates passage of fluid from the conduit 16 to the conduit 20, but prevents passage of fluid in a relatively opposite direction, that is, from the conduit 20 to the conduit 16. However, electro-magnetically actuated means are provided for opening the valve unit 46, these means including a bellcrank 48 pivotally mounted in the insert 40 as at 50, one arm of this crank being engageable with the stem 52 of the valve unit 46, while the second arm of the bellcrank is operatively connected as at 54 to a reciprocable armature 56 of an electro-magnet 58.

The magnet 58 is positioned in a substantially cylindrical housing 60 formed integrally with the valve body 24, the housing or compartment 60 being provided with a removable plug 62 to facilitate installation and possible servicing of the magnet assembly.

One end of the winding of the electro-magnet 58 is grounded, while its remaining end is connected by means of a conductor 64 to a switch assembly 66 which, in turn, is connected in series by a further conductor 68 to the conventional ignition switch 70 of the vehicle on which the invention is used.

The switch 66, which may be referred to as a secondary or an auxiliary switch, embodies in its construction a suitable base plate 72 secured to the floor-board 74 adjacent the clutch pedal 76, the switch 66 being disposed at the underside of the floor-board 74, as is best shown in Figure 4.

An insulated block 78 is provided on the base plate 72 and carries a relatively stationary contact arm and point 80 and a resilient, deflectible contact arm and point 82, this being best shown in the accompanying Figure 6.

Moreover, a pair of brackets 84 are mounted on the base plate 72 and provide bearings for an angulated portion 86 of a substantially L-shaped actuating arm 88, the free end portion of the latter being urged in engagement with the underside of the clutch pedal 76 by means of a suitable tension spring 90, as will be clearly apparent from the accompanying drawings. The portion 86 of the arm 88 carries a cam 92 which engages the deflectible contact arm and point 82, and matters are so arranged that when the clutch pedal 76 is in its released position (with the clutch engaged) the cam 92 urges the contact arm and point 82 in engagement with the contact arm and point 80, maintaining the switch 66 closed. However, when the clutch pedal 76 is depressed so as to disengage the clutch, the arm 88 will swing in the direction of the arrow 94 (see Figure 6) and the resiliency of the deflectible contact arm and point 82 is such that the two points 80, 82 will become separated and the switch will be opened.

The mechanism of the switch 66 may be provided with a suitable cover 96 attached to the base plate 72 and formed with a suitable recess 98 to accommodate the angulated portion 86 of the arm 88, that is, matters are so arranged that the cover 96 may be removed for the purpose of inspecting the switch mechanism, without disturbing the arm 88, as will be clearly apparent.

Having thus described the construction of the invention, its method of operation will now be explained.

Assuming the ignition switch 70 to be closed while the engine is running and the clutch engaged, a supply of current will be delivered through the switches 70 and 66 to the electro-magnet 58 of the valve 18, and the electro-magnet, being energized, will draw the armature 56 thereof upwardly as indicated at 100 (see Figure 2), so that the bellcrank 48 will press against the stem 52 of the valve unit 46 and thereby retain the valve unit in an open position.

Under such circumstances, hydraulic fluid may freely travel from the conduit 16 to the conduit 20 and vice versa, in response to the actuation of the master cylinder 14 in the conventional manner.

However, when the engine is stopped by opening the ignition switch 70, energization of the electro-magnet 58 will cease, the armature 56 will drop downwardly under the influence of gravity, and the valve unit 46, responding to its spring 102, will become closed. However, the spring-pressed valve unit 46 will permit hydraulic fluid to travel from the conduit 16 to the conduit 20 as has been already explained, and if the operator of the vehicle, after shutting off the engine by the switch 70, depresses the brake pedal 10, hydraulic fluid will travel from the master cylinder 14 to the wheel cylinders and the brakes will be applied. However, since the valve unit 46, under such circumstances, will prevent the fluid from traveling back to the master cylinder, the brakes will remain applied as long as the switch 70 remains open, even if the operator of the vehicle removes his foot from the brake pedal 10. It will thus be apparent that the invention will permit the operator to leave the vehicle with the hydraulic brakes applied, thus minimizing the possibility of the vehicle being towed away by unauthorized persons.

Moreover, the invention may also be effectively employed in the nature of a "hill holder" while starting the engine on inclined roads, this being accomplished by simply leaving the ignition switch 70 closed (with the engine running) and depressing the clutch pedal 76. This action will result in the switch 66 becoming open, thus closing the valve 18 in much the same manner as when the ignition switch 70 was opened, as described in the preceding paragraphs. Thereafter, while depressing the clutch pedal 76 with his left foot and first applying the brakes with his right foot, the brakes will remain applied, permitting the operator to remove his right foot to the starter pedal (not shown), if the engine of the vehicle should be stopped or become stalled on a hill.

Needless to say, the valve 18 will be opened automatically as soon as the clutch pedal 76 is returned to its "engaged" position, thereby simultaneously releasing the hydraulic brake system.

It is believed that the advantages and use of the invention will be clearly apparent from the foregoing disclosure and, accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having thus described the invention, what is claimed as new is:

In a hydraulic brake control system, an electrically actuated fluid valve comprising a housing affording an open-ended cylindrical chamber and a compartment disposed above said chamber, a substantially tubular insert positioned intermediate the ends of the chamber and provided at one of its ends with a wall having a valve port therein, the remaining end and the adjacent upper portion of said insert being open, an end cap provided in each end of said chamber and having a fluid carrying tube connected thereto in communication with the chamber, a spring-pressed closure element adapted to seat against said wall and including a stem slidable through said port, a transverse fulcrum pin provided in the open end portion of said insert, a bellcrank provided on said pin and having one arm thereof in operating engagement with said stem, a hollow cylindrical member extending upwardly into said compartment and affording a re-entrant pocket communicating at its lower end with said chamber, an electro-magnetic coil wound around said member in said compartment, and a gravity actuated plunger positioned in said pocket and slidable upwardly in response to energization of said coil, the lower end of said plunger being pivotally connected to the second arm of said bellcrank, whereby said stem may be slid to open and close said element by reciprocation of said plunger.

GUY H. WHITNEY.
ALONZO J. ROSSO.

REFERENCES CITED

The following references are of record in the file of this patent:

UNITED STATES PATENTS

| Number | Name | Date |
|---|---|---|
| 858,467 | Richards | July 2, 1907 |
| 1,050,431 | Darrin | Jan. 14, 1913 |
| 1,883,957 | Koch | Oct. 25, 1932 |
| 1,990,290 | Larkin | Feb. 5, 1935 |
| 2,052,246 | Ray | Aug. 25, 1936 |
| 2,148,190 | Darling | Feb. 21, 1939 |
| 2,168,774 | Hurlburt | Aug. 8, 1939 |
| 2,194,276 | Carlson | Mar. 19, 1940 |
| 2,217,141 | Sprinkle | Oct. 8, 1940 |
| 2,262,842 | Goepfrich | Nov. 18, 1941 |
| 2,275,890 | Coe | Mar. 10, 1942 |
| 2,287,301 | Freeman | June 23, 1942 |
| 2,287,562 | Pennington | June 23, 1942 |
| 2,313,232 | Freeman | Mar. 9, 1943 |
| 2,345,280 | Morgan | Mar. 28, 1944 |
| 2,394,215 | Stephenson | Feb. 5, 1946 |